United States Patent
Wang et al.

(10) Patent No.: US 7,897,661 B2
(45) Date of Patent: Mar. 1, 2011

(54) POLYMERIZED (SUBSTITUTED) IMIDAZOLIUM) LIQUID IONOMERS FOR IMPROVED HANDLING PROPERTIES IN SILICA-REINFORCED RUBBER COMPOUNDS

(75) Inventors: Xiaorong Wang, Hudson, OH (US); Chenchy Jeffrey Lin, Hudson, OH (US)

(73) Assignee: Bridgestone Corporation (JP)

( * ) Notice: Subject to any disclaimer, the term of this patent is extended or adjusted under 35 U.S.C. 154(b) by 0 days.

(21) Appl. No.: 12/345,931

(22) Filed: Dec. 30, 2008

(65) Prior Publication Data

US 2010/0004359 A1 Jan. 7, 2010

Related U.S. Application Data

(60) Provisional application No. 61/018,029, filed on Dec. 31, 2007.

(51) Int. Cl.
*C08K 3/04* (2006.01)
*C08K 3/36* (2006.01)
*C08K 5/09* (2006.01)
*C08K 5/3445* (2006.01)

(52) U.S. Cl. .................... 524/27; 524/261; 524/300; 524/315; 524/502; 526/258; 528/421; 528/423

(58) Field of Classification Search .................... 524/27, 524/261, 300, 315, 502; 526/258; 528/421, 528/423
See application file for complete search history.

(56) References Cited

U.S. PATENT DOCUMENTS 3,790,506 A * 2/1974 Tilson ..................... 525/404
2008/0103287 A1 * 5/2008 Chino et al. ............. 528/421

OTHER PUBLICATIONS

"Ionic Liquids"—www.organic-chemistry.org/topics/ionic-liquids.shtm.
"Ionic Liquid"—http://en.wikipedia.org/wiki/Ionic_liquid.

* cited by examiner

*Primary Examiner*—Kriellion A Sanders
(74) *Attorney, Agent, or Firm*—Meredith E. Hooker; Nathan Lewis

(57) ABSTRACT

It has been discovered that the use of a silica dispersing aid, a polymerized (substituted) imidazolium liquid ionomer (PSI), in vulcanizable rubber compositions, provides an increase in the compound modulus and satisfactory processing of silica-containing rubber compounds, especially for tire components, without sacrificing other beneficial rubber properties or increasing hysteresis.

19 Claims, 1 Drawing Sheet

POLYMERIZED (SUBSTITUTED IMIDAZOLIUM) LIQUID IONOMERS FOR IMPROVED HANDLING PROPERTIES IN SILICA-REINFORCED RUBBER COMPOUNDS

CROSS-REFERENCE TO RELATED APPLICATIONS

This application claims the benefit of priority from U.S. Provisional Application No. 61/018,029, filed on Dec. 31, 2007. This prior application, is hereby incorporated into the present application by reference.

BACKGROUND OF THE INVENTION

For a high-performance tire, stability and safety performance during high speed driving is required. In light of this, the stability of tire material properties on a severe driving course becomes important. Without being bound by theory, it is believed that tire performance can decrease during continuous running at high speeds due to the increase of tire temperature that results in degradation of tire material properties. These properties include, but are not limited to, a decreased modulus as the temperature increases. In addition to these concerns, a higher stiffness of the rubber tread block is desirable for high performance tires to produce less tread block deformation and higher traction during aggressive driving.

With the increasing dominance of silica-containing tread stocks in the tire industry, it has become apparent that the use of silica processing aids, shielding agents, and/or silanes in rubber compounds improves rubber processing. However, the use of these compounds can also result in a lower than desired modulus. It is therefore desirable to improve the processing of silica-containing rubber compounds while increasing and retaining a desirable modulus in rubber compounds, especially in those containing a high silica loading.

SUMMARY OF THE INVENTION

The invention provides new polymers comprising pendant structures of ionic liquids for use in rubber compounds. Silica-containing rubber compounds, and tire components made from them, prepared with these new polymers have excellent physical properties. In addition, ionic liquids are advantageous in rubber compounding because they are known to be "green" chemicals for many chemical reactions.

It has been discovered unexpectedly that the use of a silica dispersing aid, a polymerized (substituted imidazolium) (PSI), in vulcanizable rubber compositions, provides an increase in the compound modulus and satisfactory processing of silica-containing rubber compounds, without sacrificing other beneficial rubber properties or increasing high temperature hysteresis (e.g., 50° C. to 80° C. tan δ).

In particular, the invention provides a polymerized (substituted imidazolium) that comprises (i) a branched or unbranched polymer comprising y organic monomers (R") and comprising a plurality of pendant liquid polymeric ionomers having an anionically ionizable polar group (X) and (ii) a plurality of monomers (R) comprising an imidazole group, wherein the imidazole group is associated with at least one of the anionically ionizable groups in the polymerized (substituted imidazolium) liquid ionomer. The polymer comprising the liquid ionomers can have the formula

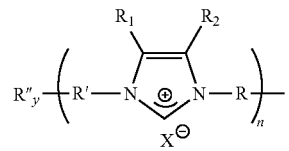

where R, R' and R" are independently selected from an alkyl group having one to about 30 carbon atoms, a cycloalkyl group having 3 to about 20 carbon atoms, and an alkylaryl group having 7 to about 20 carbon atoms, R can be H, and R" can include an oxygen atom; $R_1$ and $R_2$ are independently selected from H, an alkyl group having one to about 20 carbon atoms, and an alkenyl group having one to about 20 carbon atoms; n and y are independently about 10 to about 10,000; and the ion structure comprises a liquid ionomer containing an anionically ionizable polar group X, wherein $X^-$ is the anionically ionized polar group as it is associated with an imidazole group.

The invention also provides a vulcanizable rubber compound comprising an elastomer, a reinforcing filler comprising silica or a mixture thereof with carbon black, a silica dispersing aid comprising about 0.1 to about 20 phr of a polymerized (substituted imidazolium) liquid ionomer, and a cure agent. The vulcanizable rubber compound can also further comprise a silica coupling agent and/or a silica dispersing aid.

Also provided are a vulcanizate comprising the rubber compound and a tire including at least one component comprising the vulcanizate. In particular, the invention provides a tire having at least one component that demonstrates an improvement in the 25° C. dynamic storage modulus G' and the tensile moduli measured at 300% (M300) and/or 50% (M50) compared to a tire component comprising a vulcanized rubber compound that does not contain the polymerized (substituted imidazolium).

DETAILED DESCRIPTION OF THE INVENTION

Figure 1:
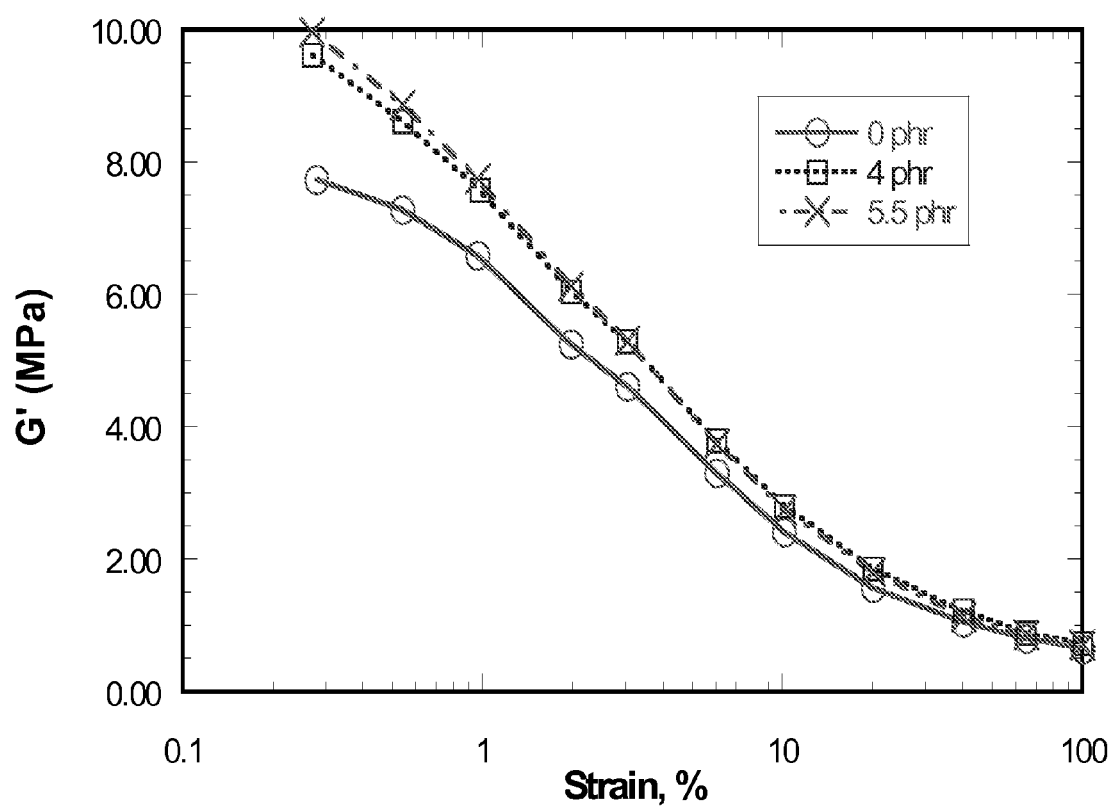
FIG. 1 illustrates the results of the strain sweep analysis of the dynamic storage modulus G' after curing of the stocks according to Table 5 containing 4 and 5.5 phr of the exemplary PSI, compared with the G' of a comparison stock containing no PSI.

The terms elastomer, polymer and rubber are used interchangeably herein, as is customary in the rubber industry.

It has been discovered unexpectedly, as described herein, that the addition of polymerized (substituted imidazolium) liquid ionomer compounds (PSI) to silica-containing rubber compositions can effectively enhance the stiffness of the resulting rubber compounds (i.e., the G' dynamic storage modulus and the tensile moduli M300 and/or M50) without raising the Mooney viscosity of the compound and without sacrificing other beneficial compound properties. It has also been discovered unexpectedly that the use of the PSI can provide an effective way to compensate for low stiffness properties in rubber compounds containing other silica dispersing agents such as, but not limited to, alkoxysilane compounds, and the like.

The polymerized (substituted imidazolium) compounds according to the present invention can be produced by polymerization of (i) a branched or unbranched polymer comprising y organic monomers (R″) and a plurality of pendant liquid ionomers (R′) having an anionically ionizable polar group (X), with (ii) a plurality of monomers (R) comprising an imidazole group, wherein the imidazole group is associated with at least one of the anionically ionizable groups in the polymerized (substituted imidazolium) liquid ionomer. In the formulas below, $R_1$ and $R_2$ are the same or different and are independently selected from the group consisting of H, an alkyl group having one to about 20 carbon atoms, and an alkenyl group having one to about 20 carbon atoms; and n and y are independently about 10 to about 10,000.

Two approaches to preparation of the polymerized (substituted imidazolium) liquid ionomer (PSI) are illustrated below, using an epichlorohydrin and an imidazole compound as examples. However, these examples are not intended to be limiting, as other methods of preparation of the PSI ionomers will become apparent to one of skill in the art of polymerization, according to the teachings of these examples.

Approach I

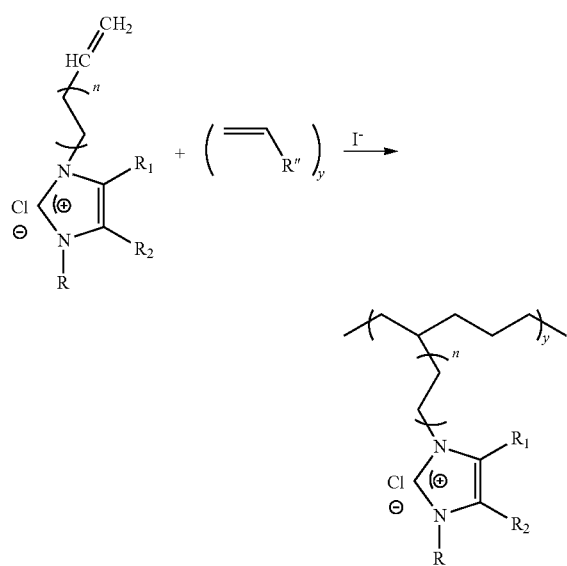

In Approach I, an epichlorohydrin polymer having an unsaturated end group is first reacted with an imidazole compound to form an epichlorohydrin/imidazole liquid ionomer with the chloride anion associated with the cationic charge on the imidazole group. The resulting unsaturated polymeric liquid ionomer is then reacted with —HC=CH—R″ monomers, in the presence of a polymerization initiator I′, to form a branched polymer comprising the monomers and a plurality of pendant epichlorohydrin/imidazole groups.

Approach II

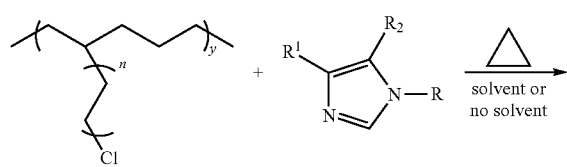

-continued

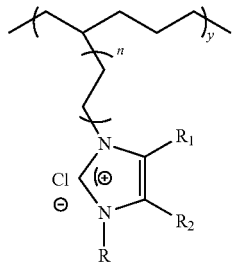

In Approach II, the branched polymer comprising the —HC=CH—R″ monomers and a plurality of pendant epichlorohydrin groups is formed first. Then the branched polymer is reacted with an imidazole-containing compound in the presence of heat, with or without a solvent for the reactants and/or the product, to form the branched polymer comprising a plurality of pendant epichlorohydrin/imidazole groups.

To prepare the branched polymer, any form of polymerization can be employed, according to conventional polymerization methods, initiators, solvents, and the like. For example, free radical chemistry for polymerization of unsaturated monomers (containing double bonds) is well known, and organic peroxide initiators are known to be used extensively as the source of the free radicals. Methods of cationic and anionic polymerization are also well known.

In the above Approach I and Approach II, the illustrated "zig-zag corners" of the various compounds can be selected from carbon atoms, oxygen atoms, sulfur atoms, and the like, without limitation. For example, the illustrated branched polymeric epichlorohydrin compound can be, but is not limited to,

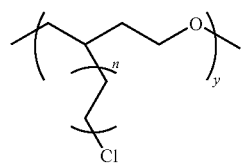

and the like.

The branched or unbranched polymer of the polymerized (substituted imidazolium) can comprise an amorphous polyether elastomer. The anionically ionizable group $X^-$ can be any anionically ionizable group including, but not limited to, halogens, inorganic acids, organic acids, and the like, and mixtures of these.

Exemplary polymers include, but are not limited to, a homopolymer of epichlorohydrin, a copolymer of epichlorohydrin/allyl glycidyl ether, a copolymer of epichlorohydrin/ethylene oxide, a terpolymer of epichlorohydrin/ethylene oxide/allyl glycidyl ether, and the like, and mixtures of these. For example, the polymer can include, but is not limited to, a polyepichlorohydrin, a poly(epichlorohydrin-co-ethylene oxide), a poly(epichlorohydrin-co-allyl glycidyl ether), a poly-epichlorohydrin-co-ethylene oxide-co-allyl glycidyl ether, a polypyrrole-polyepichlorohydrin-coethylene oxide, and the like, and mixtures of these. Commercially available epichlorohydrins such as these are available from many sources, including Zeon Chemicals, Louisville, Ky.

In the polymerized (substituted imidazolium) liquid ionomer, the plurality of monomers comprising an imidazole group can be, but are not limited to, 1-benzyl-2-methylimidazole, 1-cyanoethyl-2-phenylimidazole, 1-(2-cyanoethyl)-2-ethyl-4-methylimidazole, 2,4-diamino-6-[2'-methylimidazolyl-(1')-ethyl-s-triazine], and mixtures of these. Commercially available imidazole compounds such as these are available from many sources, including products of Shikoku Chemicals Co., Ltd. marketed under trademark designation of Curezol®, and the like.

Thus, an exemplary, but not limited, polymerized (substituted imidazolium), resulting from a reaction between, for example, an epichlorohydrin and an imidazole compound, can be a poly(1-dodecyl-2-methylimidazolium)epichlorohydrin, a poly(1-benzyl-2-methyl-imidazolium)epichlorohydrin, a poly(1-benzyl-2-phenyl-imidazolium)epichlorohydrin, or the like. As discussed above, polymerized (substituted imidazolium) compounds can also be formed from a reaction between any other polymer containing a pendant anionically ionizable group and an imidazole-containing compound.

The PSI compounds of the present invention can be used in conjunction with any solution polymerizable or emulsion polymerizable elastomer. Solution and emulsion polymerization techniques are well known to those of ordinary skill in the art. For example, conjugated diene monomers, monovinyl aromatic monomers, triene monomers, and the like, can be anionically polymerized to form conjugated diene polymers, or copolymers or terpolymers of conjugated diene monomers and monovinyl aromatic monomers (e.g., styrene, alpha methyl styrene and the like) and triene monomers. The elastomers that are typically employed within vulcanizable compositions that are useful for making tires and tire components include both natural and synthetic elastomers. For example, these elastomers include, without limitation, natural rubber, synthetic polyisoprene rubber, styrene/butadiene rubber (SBR), polybutadiene, butyl rubber, neoprene, ethylene/propylene rubber, ethylene/propylene diene rubber (EPDM), acrylonitrile/butadiene rubber (NBR), silicone rubber, fluoroelastomers, ethylene acrylic rubber, ethylene vinyl acetate copolymers (EVA) epichlorohydrin rubbers, chlorinated polyethylene rubber, chlorosulfonated polyethylene rubbers, hydrogenated nitrile rubber, tetrafluoroethylene/propylene rubber and the like. Preferred polymers for use in a vulcanized elastomeric compound of the invention include polyisoprene, polybutadiene, butadiene/isoprene copolymer, butadiene/isoprene/styrene terpolymer, isoprene/styrene copolymer, and styrene/butadiene copolymer. As used herein, the term elastomer or rubber will refer to a blend of synthetic and natural rubber, a blend of various synthetic rubbers, or simply one type of elastomer or rubber. When the preferred polymers are blended with conventional rubbers, the amounts can vary widely within a range comprising from about one to about 100 percent by weight of the total rubber, with the conventional rubber or rubbers making up the balance of the total rubber (100 parts).

The elastomers that are useful in practicing this invention include any of the various functionalized polymers that are conventionally employed in the art of making tires. For example, polymers can be terminally functionalized, or functionalized throughout the polymer backbone, such as with functional groups derived from an anionic polymerization initiator or a terminating or coupling agent. Preparation of functionalized polymers is well known to those skilled in the art. Exemplary methods and agents for functionalization of polymers are disclosed, for example, in U.S. Pat. Nos. 5,268,439, 5,496,940, 5,521,309 and 5,066,729, the disclosures of which are hereby incorporated by reference. For example, compounds that provide terminal functionality that are reactive with the polymer bound carbon-lithium moiety can be selected to provide a desired functional group. Examples of such compounds are alcohols, substituted aldimines, substituted ketimines, Michler's ketone, 1,3-dimethyl-2-imidazolidinone, 1-alkyl substituted pyrrolidinones, 1-aryl substituted pyrrolidonones, tin tetrachloride, tributyl tin chloride, carbon dioxide, and mixtures thereof. Other useful terminating agents can include those of the structural formula $R_aZX_b$, where Z is tin or silicon, R is an alkyl having from about one to about 20 carbon atoms; a cycloalkyl having from about 3 to about 30 carbon atoms; and aryl having from about 6 to about 20 carbon atoms, or an aralkyl having from about 7 to about 20 carbon atoms. For example, R can include methyl, ethyl, n-butyl, neophyl, phenyl, cyclohexyl, or the like. X is a halogen, such as chlorine or bromine, or alkoxy (—OR), "a" is an integer from zero to 3, and "b" is an integer from one to 4, where a+b=4. Examples of such terminating agents include tin tetrachloride, tributyl tin chloride, butyl tin trichloride, butyl silicon trichloride, as well as tetraethoxysilane, $Si(OEt)_4$, and methyl triphenoxysilane, $MeSi(OPh)_3$. The practice of the present invention is not limited solely to polymers terminated with these agents, since other compounds that are reactive with the polymer bound carbon-lithium moiety can be selected to provide a desired functional group.

The vulcanizable rubber compositions of the invention are preferably compounded with reinforcing fillers, such as silica, or a mixture of silica and carbon black. Examples of suitable silica reinforcing filler include, but are not limited to, precipitated amorphous silica, wet silica (hydrated silicic acid), dry silica (anhydrous silicic acid), fumed silica, calcium silicate, and the like. Other suitable fillers include aluminum silicate, magnesium silicate, and the like. Among these, precipitated amorphous wet-process, hydrated silicas are preferred. These silicas are so-called because they are produced by a chemical reaction in water, from which they are precipitated as ultrafine, spherical particles. These primary particles strongly associate into aggregates, which in turn combine less strongly into agglomerates. The surface area, as measured by the BET method gives the best measure of the reinforcing character of different silicas. For silicas of interest for the present invention, the surface area should be about 32 $m^2/g$ to about 400 $m^2/g$, with the range of about 100 $m^2/g$ to about 250 $m^2/g$ being preferred, and the range of about 150 $m^2/g$ to about 220 $m^2/g$ being most preferred. The pH of the silica filler is generally about 5.5 to about 7 or slightly over, preferably about 5.5 to about 6.8.

Silica can be employed in the amount of about one to about 150 parts by weight per hundred parts of the elastomer (phr), preferably in an amount of about five to about 80 phr and, more preferably, in an amount of about 30 to about 80 phr. The useful upper range is limited by the high viscosity imparted by fillers of this type. Some of the commercially available silicas which can be used include, but are not limited to, Hi-Sil® 190, Hi-Sil® 210, Hi-Sil® 215, Hi-Sil® 233, Hi-Sil® 243, and the like, produced by PPG Industries (Pittsburgh, Pa.). A number of useful commercial grades of different silicas are also available from Degussa Corporation (e.g., VN2, VN3), Rhone Poulenc (e.g., Zeosil® 1165 MP), and J. M. Huber Corporation.

The elastomers can be compounded with all forms of carbon black in a mixture with the silica. The carbon black can be present in amounts ranging from about one to about 50 phr, with about five to about 35 phr being preferred. The carbon blacks can include any of the commonly available, commercially-produced carbon blacks, but those having a surface area (EMSA) of at least 20 m²/g and, more preferably, at least 35 m²/g up to 200 m²/g or higher are preferred. Surface area values used in this application are determined by ASTM D-1765 using the cetyltrimethyl-ammonium bromide (CTAB) technique. Among the useful carbon blacks are furnace black, channel blacks and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. A mixture of two or more of the above blacks can be used in preparing the carbon black products of the invention. Typical suitable carbon blacks are N-110, N-220, N-339, N-330, N-351, N-550, N-660, as designated by ASTM D-1765-82a. The carbon blacks utilized in the preparation of the vulcanizable elastomeric compositions of the invention can be in pelletized form or an unpelletized flocculent mass. Preferably, for more uniform mixing, unpelletized carbon black is preferred.

The PSI may be present in the vulcanizable rubber compositions according to the invention in an amount of about 0.1 to about 20 phr, suitably about one to about 15 phr or, in some cases, about 5 to about 10 phr, or about one to about 3 phr.

The vulcanizable rubber compositions of the invention can optionally further include a silica coupling agent such as, but not limited to, a mercaptosilane, a bis(trialkoxysilylorgano) polysulfide, a 3-thiocyanatopropyl trimethoxysilane, or the like, or any of the silica coupling agents that are known to those of ordinary skill in the rubber compounding art. Exemplary mercaptosilanes include, but are not limited to, 1-mercaptomethyltriethoxysilane, 2-mercaptoethyltriethoxysilane, 3-mercaptopropyltriethoxysilane, 3-mercaptopropylmethyldiethoxysilane, 2-mercaptoethyltriproxysilane, 18-mercaptooctadecyldiethoxychlorosilane, and the like. The mercaptosilane can be present in the compound in an amount of about 0.0001% to about 3% by weight, typically about 0.001% to about 1.5% by weight, and especially about 0.01% to about 1% by weight, based on the weight of the silica. Exemplary bis(trialkoxysilylorgano)polysulfide silica coupling agents include, but are not limited to, bis(3-triethoxysilyl-propyl)tetrasulfide (TESPT), which is sold commercially under the tradename Si69 by Degussa Inc., New York, N.Y., and bis(3-triethoxysilylpropyl)disulfide (TESPD) or Si75, available from Degussa, or Silquest® A1589, available from Crompton. The polysulfide organosilane silica coupling agent can be present in an amount of about 0.01% to about 20% by weight, based on the weight of the silica, preferably about 0.1% to about 15% by weight, and especially about 1% to about 10%.

Exemplary silica dispersing aids suitable for use in the invention include, but are not limited to an alkyl alkoxysilane, an alkoxy-modified silsesquioxane (AMS and/or co-AMS such as, but not limited to, those described in our copending U.S. patent application Ser. No. 11/387,569), a fatty acid ester of a hydrogenated or non-hydrogenated $C_5$ or $C_6$ sugar, a polyoxyethylene derivative of a fatty acid ester of a hydrogenated or non-hydrogenated $C_5$ or $C_6$ sugar, and mixtures thereof or a mineral or non-mineral additional filler, as described in greater detail below. The alkyl alkoxysilane and/or the alkoxy-modified silsesquioxane (AMS and/or co-AMS) can be present in the compound in an amount of about 0.1% to about 25% by weight, especially about 0.1% to about 15% by weight, based on the weight of the silica.

Exemplary fatty acid esters of hydrogenated and non-hydrogenated $C_5$ and $C_6$ sugars (e.g., sorbose, mannose, and arabinose) that are useful as silica dispersing aids include, but are not limited to, the sorbitan oleates, such as sorbitan monooleate, dioleate, trioleate and sesquioleate, as well as sorbitan esters of laurate, palmitate and stearate fatty acids. Fatty acid esters of hydrogenated and non-hydrogenated $C_5$ and $C_6$ sugars are commercially available from ICI Specialty Chemicals (Wilmington, Del.) under the trade name SPAN®. Representative products include SPAN® 60 (sorbitan stearate), SPAN® 80 (sorbitan oleate), and SPAN® 85 (sorbitan trioleate). Other commercially available fatty acid esters of sorbitan are also available, such as the sorbitan monooleates known as Alkamul® SMO; Capmul® O; Glycomul® O; Arlacel® 80; Emsorb® 2500; and S-Maz® 80. A useful amount of these additional silica dispersing aids when used with the bis(trialkoxysilylorgano)polysulfide silica coupling agents is about 0.1% to about 25% by weight based on the weight of the silica, with about 0.5% to about 20% by weight being preferred, and about 1% to about 15% by weight based on the weight of the silica being more preferred. In the alkyl alkoxysilane and mercaptosilane embodiment of the invention, it may be desirable to use about 0.1% to about 20% by weight of the fatty acid ester based on the weight of the silica. Esters of polyols, including glycols such as polyhydroxy compounds and the like, in the same quantities, are also useful in all invention embodiments.

Exemplary polyoxyethylene derivatives of fatty acid esters of hydrogenated and non-hydrogenated $C_5$ and $C_6$ sugars include, but are not limited to, polysorbates and polyoxyethylene sorbitan esters, which are analogous to the fatty acid esters of hydrogenated and non-hydrogenated sugars noted above except that ethylene oxide groups are placed on each of the hydroxyl groups. Representative examples of polyoxyethylene derivatives of sorbitan include POE® (20) sorbitan monooleate, Polysorbate 80, Tween® 80, Emsorb® 6900, Liposorb® O-20, T-Maz® 80, and the like. The Tween® products are commercially available from ICI Specialty Chemicals. Generally, a useful amount of these optional silica dispersing aids is about 0.1% to about 25% by weight based on the weight of the silica, with about 0.5% to about 20% by weight being preferred, and about 1% to about 15% by weight based on the weight of the silica being more preferred.

The silica coupling agents, the alkyl alkoxysilanes, the AMS and/or the co-AMS compounds, the fatty acid esters and their polyoxyethylene derivatives, and the strong organic base catalysts, can be fully or partially supported by the reinforcing filler. The ratio of the dispersing aid or catalyst to the reinforcing filler is not critical. If the dispersing aid is a liquid, a suitable ratio of dispersing aid to filler is that which results in a suitably dry material for addition to the elastomer. For example, the ratio can be about 1/99 to about 70/30, about 20/80, about 60/40, about 50/50, and the like.

Certain additional fillers can be utilized according to the present invention as processing aids, including mineral fillers, such as clay (hydrous aluminum silicate), talc (hydrous magnesium silicate), aluminum hydrate [Al(OH)$_3$] and mica, as well as non-mineral fillers such as urea and sodium sulfate. Preferred micas principally contain alumina and silica, although other known variants are also useful. The foregoing additional fillers are optional and can be utilized in the amount of about 0.5 to about 40 phr, preferably in an amount of about one to about 20 phr and, more preferably in an amount of about one to about 10 phr. These additional fillers can also be used as non-reinforcing fillers to support the strong organic base catalysts, as well as any of the silica dispersing aids, and silica coupling agents described above.

As with the support of the silica dispersing aid on the reinforcing filler, as described above, the ratio of dispersing aid to non-reinforcing filler is not critical. For example, the ratio can be about 1/99 to about 70/30, about 20/80, about 60/40, about 50/50, and the like, by weight.

The vulcanizable rubber compositions are compounded or blended by using mixing equipment and procedures conventionally employed in the art, such as mixing the various vulcanizable polymer(s) with reinforcing fillers and commonly used additive materials such as, but not limited to, curing agents, activators, retarders and accelerators; processing additives, such as oils; resins, including tackifying resins; plasticizers; pigments; additional fillers; fatty acid; zinc oxide; waxes; antioxidants; antiozonants; peptizing agents; and the like. As known to those skilled in the art, the additives mentioned above are selected and commonly used in conventional amounts.

Preferably, an initial master batch is prepared that includes the rubber component and the reinforcing fillers, as well as other optional non-curative additives, such as processing oil, antioxidants, and the like. After the master batch is prepared, one or more optional remill stages can follow in which either no ingredients are added to the first mixture, or the remainder of the non-curing ingredients are added, in order to reduce the compound viscosity and improve the dispersion of the reinforcing filler. The final step of the mixing process is the addition of vulcanizing agents to the mixture.

According to the embodiments of this invention, it is preferred to add the PSI during preparation of the master batch. However, the PSI alternatively can be added during subsequent stages, including the remill stage(s) and/or the final stage, and still provide the desired processability of the compound, as well as the favorable mechanical and viscoelastic properties, including improved modulus of the final rubber compound.

The vulcanizable composition can then be processed according to ordinary tire manufacturing techniques. Likewise, the tires are ultimately fabricated by using standard rubber curing techniques. For further explanation of rubber compounding and the additives conventionally employed, one can refer to The Compounding and Vulcanization of Rubber, by Stevens in Rubber Technology, Second Edition (1973 Van Nostrand Reibold Company), which is incorporated herein by reference. The reinforced rubber compounds can be cured in a conventional manner with known vulcanizing agents at about 0.1 to 10 phr. For a general disclosure of suitable vulcanizing agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, or Vulcanization by A. Y. Coran, Encyclopedia of Polymer Science and Engineering, Second Edition (1989 John Wiley & Sons, Inc.), both of which are incorporated herein by reference. Vulcanizing agents can be used alone or in combination. Preferably, the rubber compounds are sulfur-vulcanized. Cured or crosslinked polymers will be referred to as vulcanizates for purposes of this disclosure.

The vulcanizable rubber compositions of the present invention can be utilized to form treadstocks for tires. Pneumatic tires can be made according to the constructions disclosed in U.S. Pat. Nos. 5,866,171; 5,876,527; 5,931,211; and 5,971,046, the disclosures of which are incorporated herein by reference. The composition can also be used to form other elastomeric tire components such as subtreads, black sidewalls, body ply skims, bead fillers and the like.

In addition to the advantageous features of the present invention noted above, the cost of producing tires can be significantly reduced by employing the formulations according to the present invention. Because PSI is added to tire formulations or recipes without deleteriously impacting the ultimate properties of the tires, the use of this additive yields significant cost savings.

EXAMPLES

The following examples illustrate methods of preparation of a representative poly (substituted imidazolium) liquid ionomer (PSI) compound and rubber compounds and tire components containing them. However, the examples are not intended to be limiting, as other similar PSI materials can be prepared according to the described methods. Moreover, the methods are exemplary only and other methods for preparing the PSI and other rubber compounds, including different compounding formulations, can be determined by those skilled in the art without departing from the scope of the invention herein disclosed and claimed.

Example 1

Preparation of Poly(1-benzyl-2-methyl-imidazolium)epichlorohydrin (PSI)

A nitrogen purged Brabender mixer (about 300 g capacity) was initially set to 60 rpm and 70° C. The mixer was then charged with 104.6 g of Hydrin H (polyepichlorohydrin, $M_W$=150 kg/mole, Zeon Chemicals). After 5 minutes, 197.1 g of Curezol 1B2MZ (1-benzyl-2-methylimidazole, Shikoku Chemicals Corp.) was slowly added into the mixer at a feeding rate of about 2 g/min. After the addition of the Curezol, the Brabender agitation speed was adjusted to 30 rpm and the heating element was set to 150° C. After mixing for 70 minutes, the material in the mixer became very viscous and the temperature was adjusted to 160° C. After mixing for an additional 170 minutes, the heating element of the mixer was turned off, and the resultant product, poly(1-benzyl-2-methyl-imidazolium)epichlorohydrin, was allowed to cool. The product was then removed from the mixer.

Example 2

Evaluation of the PSI in Silica-Reinforced Rubber Compounds

The PSI product prepared in Example 1, poly(1-benzyl-2-methyl-imidazolium)epichlorohydrin, was evaluated for use in a rubber composition. Two rubber stocks were compounded with silica and a disulfane silica coupling agent, according to the formulations illustrated in Table 1. A comparison stock 1 not containing PSI and a rubber stock 2 containing 4 phr of PSI were prepared. The PSI was added in the master batch stage; although it could have added in the remill stage or any other stage prior to the final stage. All of the charges are listed as parts per hundred rubber (phr). The drop temperatures of the mixing steps were as follows: master batch 1, 154° C.; remill, 143° C.; and final, 105° C. All of the compounded final stocks were sheeted and subsequently annealed at 171° C. for 15 minutes.

TABLE 1

Rubber Formulations

| Ingredient | Amount (phr) |
|---|---|
| Natural rubber | 20 |
| SBR | 96* |

TABLE 1-continued

Rubber Formulations

| Ingredient | Amount (phr) |
|---|---|
| Precipitated silica | 80 |
| PSI (from Example 1) | various |
| Aromatic oil | 20 |
| Wax | 1.5 |
| Antioxidant** | 0.95 |
| Stearic acid | 2.0 |
| Silica coupling agent (disulfane) | 7.41 |
| Sulfur | 2.35 |
| Accelerator*** | 1.5 |
| Zinc oxide | 2.5 |
| Diphenyl guanidine | 0.5 |

*Solution SBR: 35% styrene, 12% vinyl, containing 20 phr of aromatic oil.
**[N-(1,3 dimethylbutyl)-N'-phenyl-p-phenylenediamine]
***[N-cyclohexyl-2-benzothiazolesulfenamine]

Example 3

Processing Evaluation of Rubber Compound

The processing of the green stocks (i.e., the stock obtained after the final stage, prior to curing) was characterized as to Mooney viscosity and cure characteristics. In particular, the comparison stock 1 and the rubber stock A containing 4 phr PSI was evaluated by examining the compound Mooney viscosity and scorch data, as illustrated in Table 2. The Mooney viscosity measurement was conducted at 130° C. using a large rotor. The Mooney viscosity was recorded as the torque when the rotor was rotated for 4 minutes. The samples were preheated at 130° C. for one minute before the rotor was started. A Monsanto Rheometer MD2000 was used to characterize the stock curing process. The frequency was 1.67 Hz and the strain was 7% at 160° C. The $Ts_2$ and T90 were obtained from these measurements and represent the time when the torque rose to 2% and 90%, respectively, of the total torque increase during the curing process. These measurements were used to predict how quickly the viscosity built up ($Ts_2$) and the curing rate (T90) during the curing process. The results of the compound Mooney (ML) and curing characteristics are shown in Table 2. The ML of the rubber stock A containing the PSI was 14 units lower than the comparison stock 1, with a longer $Ts_2$ and a faster curing rate (T90).

TABLE 2

The Green Stock Mooney Viscosity and Curing Characteristics

| Stock No. | ML @ 130° C. | $Ts_2$ @ 160° C. (min) | T90 @ 160° C. (min) |
|---|---|---|---|
| Comparison Stock 1 | 81 | 0.32 | 19.44 |
| Rubber Stock A | 67 | 0.66 | 12.90 |

Example 4

Tire Performance Predicted Based on the Measured Dynamic Viscoelastic Mechanical Properties The dynamic viscoelastic properties for the stocks prepared in Example 1 were obtained from temperature sweep tests conducted with a frequency of 31.4 rad/sec using 0.5% strain for temperatures ranging from –100° C. to –20° C., and 2% strain for temperatures ranging from –20° C. to 100° C. The results are illustrated in Table 3. The PSI stock (rubber stock A) had a lower value of 50° C. tan δ and a higher value of the 25° C. dynamic storage modulus G'. This is useful because the 50° C. tan δ is used to predict the rolling resistance, while the G' at 25° C. is used to predict the driving handling. There, it is predicted that the rubber stock A, containing 4 phr of PSI will have better handling and a lower rolling resistance, compared to the comparison stock 1 that did not contain PSI.

TABLE 3

Viscoelastic Properties Measured by Temperature Sweep

| Stock No. | G' @ 25° C. (MPa) | tan δ @ 50° C. |
|---|---|---|
| Comparison Stock 1 | 9.23 | 0.1606 |
| Rubber Stock A | 13.98 | 0.1542 |

These favorable properties of the PSI-containing stock were confirmed by measuring the dynamic viscoelastic properties using the dynamic compression test and rebound tests. The results are shown in Table 4. The sample geometry used for the dynamic compression test was a cylindrical button having a diameter of 9.5 mm and a length of 15.6 mm. The sample was compressed under a static load of 2 kg before testing. After an equilibrium state was reached, the test was started with a dynamic compression load of 1.25 Kg at a frequency of 1 Hz. The sample was dynamically compressed and then extended, and the resultant dynamic storage compression modulus (K' @ 50° C.') and the hysteresis (tan δ) were then recorded.

The Zwick rebound resilience tester measured rebound resilience as a very basic dynamic test. The test piece was subjected to one-half cycle of deformation. The sample geometry was round with a diameter of 38 mm and a thickness of 19 mm. The specimen was strained by impacting the test piece with an indentor which was free to rebound after the impact. The rebound resilience is defined as the ratio of mechanical energies before and after impact. Samples were preheated 30 minutes prior to testing.

TABLE 4

Viscoelastic Properties Measured by MTS Dynamic Compression Test and Rebound

| Stock No. | K' @ 50° C. (MPa) | tan δ @ 50° C. | Rebound @ 50° C. |
|---|---|---|---|
| Comparison Stock 1 | 3.67 | 0.1299 | 53.4 |
| Rubber Stock A | 5.69 | 0.1194 | 54.4 |

Example 5

Evaluation of Properties of Silica-Reinforced Rubber Compounds Using Various Amounts of PSI Rubber stocks were prepared according to the same formulation illustrated in Table 1 except the amount of PSI in the stocks was either higher or lower than that used in Examples 2 through 4. The results are illustrated in Tables 5 and 6. The green stocks were characterized as to Mooney viscosity and Payne effect (ΔG') which is a measure of filler microdispersion. The Payne effect was measured using an RPA 2000 viscometer (Alpha Technologies). The strain sweep test (ΔG') was conducted at 50° C. at 0.1 Hz using strain sweeping from 0.25% to 1000%. The δ (ΔG') represents the change in the ΔG' of the remill stock before and after annealing at 171° C. for 15 minutes. The value of tan δ at 0° C. can be used to predict the tire wet traction, and the value of the tan δ at 50° C. can be used to predict the rolling resistance properties of the tires. The G' at −20° C. is a predictor of tire ice and snow traction.

FIG. 1 illustrates the results of the strain sweep analysis of G' after curing of RPA-cured stocks Comparison 2, Rubber Stock B and Rubber Stock C of Table 5.

TABLE 5

|  | Stock No. | | |
|---|---|---|---|
|  | Comparison Stock 2 | Rubber Stock B | Rubber Stock C |
| PSI (phr) | 0 | 4 | 5.5 |
| ML @ 130° C. | 81 | 67 | 78 |
| δ (Δ G') (MPa) | 4.57 | 4.33 | 4.09 |
| G' @ 25° C. (MPa) | 9.23 | 13.98 | 15.72 |
| Δ G' (MPa) | 6.06 | 10.1 | 13.83 |
| Tan δ @ 50° C. | 0.1606 | 0.1542 | 0.1504 |

The data of Table 5 illustrate that rubber stocks B and C, containing 4 phr or 5.5 phr of the PSI, respectively, show a comparable rolling resistance (tan δ @ 50° C.) compared with stocks containing no PSI (comparison stock 2). The decrease in Mooney viscosity in the PSI-containing rubber stocks is beneficial to processing. A significant increase in the 25° C. dynamic storage modulus G' in PSI-containing stocks also predicts a significant improvement in the driving handling when employing tires with treads containing these stocks.

The PSI provides a means to attaining a higher G' (storage modulus) and M300 (tensile modulus). Table 6 illustrates a comparison of the physical properties of rubber stocks D and E that contain 1 phr and 2 phr of PSI, respectively, with a control stock comparison 3 that contains no PSI. Both rubber stocks show an increase of about 20% to about 25% in the dynamic storage modulus at 25° C. and the M300 modulus, in addition to significant increases in the 50° C. G' and M50 modulus. The compound Mooney viscosities between the test stocks and the comparison stock are comparable. All other physical properties of the PSI stocks are comparable to the control sample.

Example 6

Evaluation of Properties of Silica-Reinforced Rubber Compounds Using PSI and an AMS-MPS co-AMS Silica Dispersing Agent Rubber stocks were prepared according to the formulation illustrated in Table 7. The silica processing aid AMS-MPS (alkoxy-modified silsesquioxane/3-mercaptopropylsilane co-AMS) was added to the Rubber Stock G in addition to 3.0 phr of the PSI from Example 1, as well as a further silica processing aid, sorbitan monooleate. Comparison Stock 5 was the same as Rubber Stock G, except that it did not contain PSI. Comparison Stock 4 contained a disulfane silica coupling agent and did not contain PSI. The properties of the rubber stocks are illustrated in Table 8.

Rubber Stock G, containing PSI, shows a significant increase in the M300 modulus of elasticity, in addition to an increase in the significant increase in the snow traction (lower G' @ −20° C.) and the bound rubber content. The compound Mooney viscosities between the test stock and the control stocks are comparable. The curing onset of the PSI stock, again, is slightly faster than the comparison stocks. All other physical properties of the PSI stock are comparable to the control samples. It was found that Rubber Stock G that contained both AMS-MPS and PSI had a higher G' at both 25° C. and 50° C. than Comparison Stock 5 containing the AMS-MPS and no PSI. It was noted that Comparison Stock 5 had a lower G' that Comparison Stock 4 containing only the disulfane.

While the invention has been described herein with reference to the preferred embodiments, it is to be understood that it is not intended to limit the invention to the specific forms disclosed. On the contrary, it is intended that the invention cover all modifications and alternative forms falling within the scope of the appended claims.

TABLE 6

|  | Stock No. | | |
|---|---|---|---|
|  | Comparison Stock 3 | Rubber Stock D | Rubber Stock E |
| PSI (phr) | 0 | 1 | 2 |
| ML @ 130° C. | 79 | 79 | 77 |
| δ (Δ G') (MPa) | 4.26 | 4.48 | 4.31 |
| G' @ 25° C. | 10.08 | 12.56 | 12.98 |
| G' @ 50° C. | 8.13 | 10.3 | 10.58 |
| MDR @ 160° C. | | | |
| T10 | 3.36 | 1.11 | 0.63 |
| T50 | 9.4 | 4.49 | 3.52 |
| T90 | 19.37 | 17.17 | 14.41 |
| MH-ML | 19.13 | 19.98 | 20.42 |
| Ts2 | 3.71 | 1.11 | 0.58 |
| tan δ @ 50° C. | | | |
| Temp. Sweep 2% strain | 0.1436 | 0.1361 | 0.1398 |
| Strain Sweep 2% RDA | 0.1397 | 0.1692 | 0.1566 |
| Strain Sweep 2% RPA | 0.119 | 0.121 | 0.128 |
| Dynamic compression | 0.116 | 0.1074 | 0.1105 |
| 50° C. Rebound | 54.20 | 55.80 | 54.80 |
| tan δ @ 0° C. | | | |
| Temp. Sweep | 0.22638 | 0.2489 | 0.2434 |
| Strain Sweep 2% | 0.1561 | 0.1578 | 0.1412 |
| Dynamic compression | 0.2094 | 0.2307 | 0.2208 |
| Ring tear kN/m @ 171° C. | 19.49 | 19.48 | 20.08 |
| Ring tensile @ 25° C. | | | |
| M50 (MPa) | 1.23 | 1.33 | 1.41 |
| M300 (MPa) | 7.83 | 9.39 | 9.92 |
| Tb (MPa) | 22.22 | 23.22 | 22.88 |
| Eb (%) | 591 | 554 | 537 |
| Toughness (MPa) | 53.11 | 52.86 | 51.25 |

TABLE 7

Rubber Formulations

| Ingredient | Amount (phr) |
|---|---|
| High cis polybutadiene, 1% vinyl | 15 |
| SBR | 116.88* |
| Precipitated silica | 56 |
| Carbon black | 26 |
| PSI (from Example 1) | various |
| Aromatic oil | 8 |
| Wax | 1.5 |
| Antioxidant** | 0.95 |
| Stearic acid | 1.0 |
| Silica coupling agent (disulfane) | 4.92 |
| Sulfur | 2.3 |
| Accelerator 1*** | 0.8 |
| Accelerator 2*** | 0.8 |
| Zinc oxide | 2.5 |
| Diphenyl guanidine | 0.5 |

*Solution SBR: 25% styrene, 8% vinyl, containing 35 phr of aromatic oil.
**[N-(1,3 dimethylbutyl)-N'-phenyl-p-phenylenediamine]
***Benzothiazyl disulfide; [N-tert-Butyl-2-Benzothiazyl sulfonamide]

TABLE 8

| | Stock No. | | |
|---|---|---|---|
| | Comparison Stock 4 | Comparison Stock 5 | Rubber Stock G |
| Silica Dispersing Aid (phr) | Disulfane 4.92 | AMS-MPS** 2.35 | AMS-MPS** 2.35 |
| Sorbitan Monooleate (phr) | 0 | 2.00 | 2.00 |
| PSI from Example 1 | 0 | 0.0 | 3.0 |
| ML @ 130° C. | 75.9 | 70.4 | 71.1 |
| MDR @ 160° C. | | | |
| T50 | 3.68 | 2.57 | 1.7 |
| T90 | 16.07 | 15.94 | 16.26 |
| MH-ML | 17.15 | 17.3 | 16.26 |
| Ts2 | 1.57 | 1.14 | 0.82 |
| G' @ 25° C. (MPa) | 8.48 | 7.6 | 8.98 |
| G' @ 50° C. (MPa) | 6.61 | 5.69 | 6.93 |
| Ring Tensile @ 25° C. | | | |
| M50 (MPa) | 1.5 | 1.41 | 1.58 |
| M300 (MPa) | 9.3 | 9.54 | 10.75 |
| tan δ @ 50° C. | | | |
| Temp sweep | 0.2308 | 0.1921 | 0.1791 |
| Strain sweep RDA | 0.2269 | 0.1822 | 0.1849 |
| Strain sweep RPA | 0.2250 | 0.2000 | 0.1910 |
| Dynamic compression | 0.2214 | 0.1817 | 0.1915 |
| 50° C. Rebound | 48.20 | 52.80 | 52.80 |
| tan δ @ 0° C. | | | |
| Temp sweep | 0.3306 | 0.3076 | 0.3007 |
| Strain sweep RDA | 0.2831 | 0.2588 | 0.2549 |
| Dynamic Compression | 0.2221 | 0.2656 | 0.2550 |
| G' @ −20° C. | 25.4 | 19.9 | 22.7 |
| Snow traction | | | |
| Δ G' (MPa) | 5.03 | 2.8 | 3.61 |
| Bound rubber | 39.05 | 45.41 | 48.05 |
| Ring tear kN/m @ 171° C. | 16.31 | 15.55 | 15.81 |
| Eb (%) | 286 | 284 | 282 |

We claim:

1. A polymerized (substituted imidazolium) liquid ionomer that comprises (i) a branched ($R''_y/R'$) or unbranched ($R''_y$) polymer comprising y organic monomers ($R''$) and a plurality of pendant anionically ionized polar groups ($X^-$) and (ii) a plurality (n) of substituted imidazolium groups, each having at least one nitrogen (N) covalently bonded to a carbon atom of the branched or unbranched polymer (i), wherein at least one of the substituted imidazolium groups is cationically bonded to at least one of the plurality of pendant polar groups ($X^-$) of the polymer (i), the polymerized (substituted imidazolium) liquid ionomer having the formula

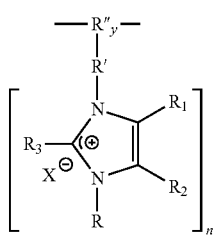

wherein R' is optional, and R' (when present) and R'' are independently selected from an alkenyl group having one to about 30 carbon atoms, a cycloalkenyl group having 3 to about 20 carbon atoms, and an arylalkenyl group having 7 to about 20 carbon atoms, and R'' can include an oxygen atom; R and $R_3$ are independently selected from an alkyl group, a cycloalkyl group, a cyanoalkyl group and an arylalkyl group; $R_1$ and $R_2$ are independently selected from H, an alkyl group having one to about 20 carbon atoms, a cycloalkyl group having 3 to about 20 carbons, and an arylalkyl group having 7 to about 20 carbon atoms; and n and y are independently about 10 to about 10,000.

2. The polymerized (substituted imidazolium) liquid ionomer of claim 1, wherein the polymerized (substituted imidazolium) liquid ionomer is for use in a rubber composition.

3. The polymerized (substituted imidazolium) liquid ionomer of claim 1, wherein the branched or unbranched polymer comprises an amorphous polyether elastomer.

4. The polymerized (substituted imidazolium) liquid ionomer of claim 1, wherein the branched or unbranched polymer comprises a selection from the group consisting of a homopolymer of epichlorohydrin, a copolymer of epichlorohydrin/allyl glycidyl ether, a copolymer of epichlorohydrin/ethylene oxide, a terpolymer of epichlorohydrin/ethylene oxide/allyl glycidyl ether, and mixtures thereof.

5. The polymerized (substituted imidazolium) liquid ionomer of claim 4, wherein the branched or unbranched polymer is selected from the group consisting of polyepichlorohydrin, poly(epichlorohydrin-co-ethylene oxide), poly(epichlorohydrin-co-allyl glycidyl ether), poly-epichlorohydrin-co-ethylene oxide-co-allyl glycidyl ether, polypyrrole-polyepichlorohydrin-coethylene oxide, and mixtures thereof.

6. The polymerized (substituted imidazolium) liquid ionomer of claim 1, wherein the polymerized (substituted imidazolium) liquid ionomer is selected from the group consisting of an epichlorohydrin and an imidazole compound, can be a poly(1-dodecyl-2-methylimidazolium) epichlorohydrin, a poly(1-benzyl-2-methyl-imidazolium) epichlorohydrin, a poly(1-benzyl-2-phenyl-imidazolium) epichlorohydrin and mixtures thereof.

7. The polymerized (substituted imidazolium) liquid ionomer of claim 1, wherein the plurality of substituted imidazolium groups are independently selected from the group consisting of 1-benzyl-2-methylimidazole, 1cyanoethyl-2-phenylimidazole, 1-(2-cyanoethyl)-2-ethyl-4-methylimidazole, 2,4-diamino-6-[2'-methylimidazolyl-(1')-ethyl-s-triazine], and mixtures thereof.

8. The polymerized (substituted imidazolium) liquid ionomer of claim 1, wherein the plurality of pendant anionically ionized polar groups ($X^-$) are selected from the group consisting of a halogen, an inorganic acid, an organic acid, and mixtures thereof.

9. A vulcanizable rubber compound comprising
   (a) an elastomer;
   (b) a reinforcing filler comprising silica or a mixture thereof with carbon black;
   (c) a silica dispersing aid comprising about 0.1 to about 20 phr of a polymerized (substituted imidazolium) liquid ionomer according to claim 1; and
   (d) a cure agent.

10. The compound of claim 9, wherein the elastomer is selected from the group consisting of homopolymers of a conjugated diene monomer, and copolymers and terpolymers of the conjugated diene monomers with monovinyl aromatic monomers and trienes.

11. The compound of claim 9, wherein the polymerized (substituted imidazolium) liquid ionomer is present in an amount of about one to about 15 phr.

12. The compound of claim 11, wherein the polymerized (substituted imidazolium) liquid ionomer is present in an amount of about 5 to about 10 phr.

13. The compound of claim 12, wherein the polymerized (substituted imidazolium) liquid ionomer is present in an amount of about one to about 3 phr.

14. The compound of claim 9, further comprising a silica coupling agent.

15. The compound of claim 9, further comprising a silica dispersing aid selected from the group consisting of an alkyl alkoxysilane, an alkoxy-modified silsesquioxane, a fatty acid ester of a hydrogenated or non-hydrogenated $C_5$ or $C_6$ sugar, a polyoxyethylene derivative of a fatty acid ester of a hydrogenated or non-hydrogenated $C_5$ or $C_6$ sugar, an ester of a polyol, and mixtures thereof.

16. The compound of claim 15, wherein the fatty acid ester is selected from the group consisting of sorbitan monooleate, sorbitan dioleate, sorbitan trioleate, sorbitan sesquioleate, sorbitan laurate, sorbitan palmitate, sorbitan stearate, and mixtures thereof.

17. A vulcanizate comprising the vulcanizable rubber compound of claim 9.

18. A tire including at least one component comprising a vulcanized rubber that comprises a vulcanizable rubber compound according to claim 9.

19. The tire of claim 18, wherein the at least one component demonstrates an improvement in the 25° C. dynamic storage modulus G' and the M50 and M300 tensile moduli compared to a tire component comprising a vulcanized rubber compound that does not contain the polymerized (substituted imidazolium) liquid ionomer.

* * * * *